US012323352B2

(12) United States Patent
Horn et al.

(10) Patent No.: US 12,323,352 B2
(45) Date of Patent: Jun. 3, 2025

(54) REFERENCE SIGNAL PERIODICITY BASED AT LEAST IN PART ON USER EQUIPMENT INFORMATION

(71) Applicant: QUALCOMM Incorporated, San Diego, CA (US)

(72) Inventors: Idan Michael Horn, Hod Hasharon (IL); Shay Landis, Hod Hasharon (IL); Amit Bar-Or Tillinger, Tel-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/822,693

(22) Filed: Aug. 26, 2022

(65) Prior Publication Data
US 2024/0072957 A1 Feb. 29, 2024

(51) Int. Cl.
H04L 5/00 (2006.01)

(52) U.S. Cl.
CPC .......... *H04L 5/0048* (2013.01); *H04L 5/0078* (2013.01)

(58) Field of Classification Search
CPC .......................... H04L 5/0048; H04L 5/0078
USPC ......................................................... 370/329
See application file for complete search history.

(56) References Cited

U.S. PATENT DOCUMENTS

2019/0372727 A1* 12/2019 Joseph ................ H04L 27/2613
2020/0267648 A1*  8/2020 Kim .................. H04W 52/0216
2021/0337560 A1* 10/2021 Xiao ................. H04W 72/0453

* cited by examiner

*Primary Examiner* — Faisal Choudhury
(74) *Attorney, Agent, or Firm* — Harrity & Harrity LLP

(57) ABSTRACT

Various aspects of the present disclosure generally relate to wireless communication. In some aspects, a user equipment (UE) may transmit an indication of information associated with a periodicity of reference signals (RSs). The UE may receive, based at least in part on the indication of information associated with the periodicity of the RSs, an indication of a timing configuration for receiving the RSs. Numerous other aspects are described.

30 Claims, 11 Drawing Sheets

REFERENCE SIGNAL PERIODICITY BASED AT LEAST IN PART ON USER EQUIPMENT INFORMATION

FIELD OF THE DISCLOSURE

Aspects of the present disclosure generally relate to wireless communication and to techniques and apparatuses for reference signal periodicity based at least in part on user equipment information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
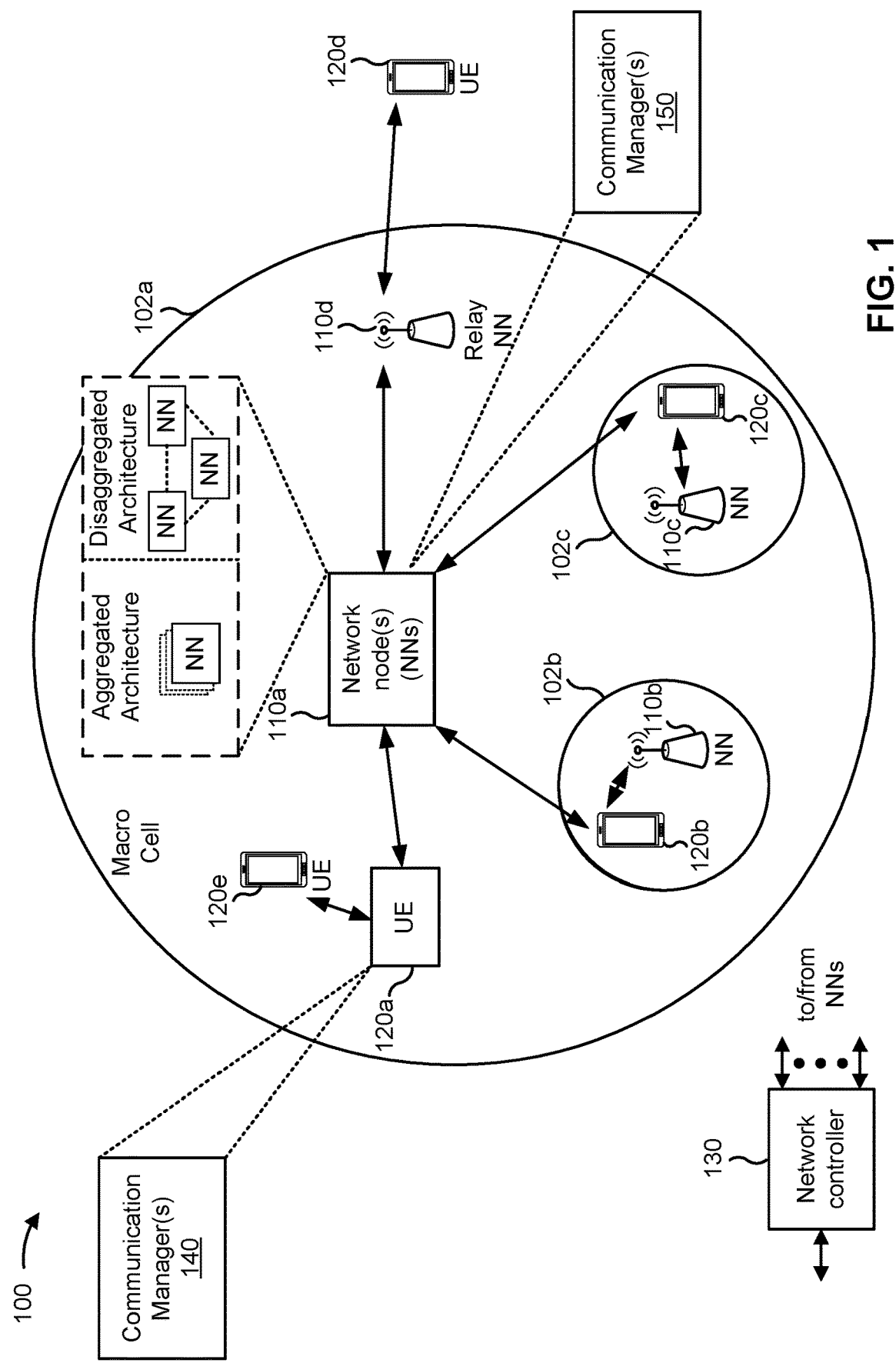
FIG. 1 is a diagram illustrating an example of a wireless network, in accordance with the present disclosure.

Some aspects described herein relate to a method of wireless communication performed by a user equipment (UE). The method may include transmitting an indication of information associated with a periodicity of reference signals (RSs). The method may include receiving, based at least in part on the indication of information associated with the periodicity of the RSs, an indication of a timing configuration for receiving the RSs.

Some aspects described herein relate to a method of wireless communication performed by a network node. The method may include receiving, from a UE, an indication of information associated with a periodicity of RSs. The method may include transmitting, based at least in part on the indication of information associated with the periodicity of the RSs, an indication of a timing configuration for transmitting the RSs.

Some aspects described herein relate to a UE for wireless communication. The user equipment may include a memory and one or more processors coupled to the memory. The one or more processors may be configured to transmit an indication of information associated with a periodicity of RSs. The one or more processors may be configured to receive, based at least in part on the indication of information associated with the periodicity of the RSs, an indication of a timing configuration for receiving the RSs.

Some aspects described herein relate to a network node for wireless communication. The network node may include a memory and one or more processors coupled to the memory. The one or more processors may be configured to receive, from a UE, an indication of information associated with a periodicity of RSs. The one or more processors may be configured to transmit, based at least in part on the indication of information associated with the periodicity of the RSs, an indication of a timing configuration for transmitting the RSs.

Some aspects described herein relate to a non-transitory computer-readable medium that stores a set of instructions for wireless communication by a UE. The set of instructions, when executed by one or more processors of the UE, may cause the UE to transmit an indication of information associated with a periodicity of RSs. The set of instructions, when executed by one or more processors of the UE, may cause the UE to receive, based at least in part on the indication of information associated with the periodicity of the RSs, an indication of a timing configuration for receiving the RSs.

Some aspects described herein relate to a non-transitory computer-readable medium that stores a set of instructions for wireless communication by a network node. The set of instructions, when executed by one or more processors of the network node, may cause the network node to receive, from a UE, an indication of information associated with a periodicity of RSs. The set of instructions, when executed by one or more processors of the network node, may cause the network node to transmit, based at least in part on the indication of information associated with the periodicity of the RSs, an indication of a timing configuration for transmitting the RSs.

Some aspects described herein relate to an apparatus for wireless communication. The apparatus may include means for transmitting an indication of information associated with a periodicity of RSs. The apparatus may include means for receiving, based at least in part on the indication of information associated with the periodicity of the RSs, an indication of a timing configuration for receiving the RSs.

Some aspects described herein relate to an apparatus for wireless communication. The apparatus may include means for receiving, from a UE, an indication of information associated with a periodicity of RSs. The apparatus may include means for transmitting, based at least in part on the indication of information associated with the periodicity of the RSs, an indication of a timing configuration for transmitting the RSs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit an indication of information associated with a periodicity of RSs; and receive, based at least in part on the indication of information associated with the periodicity of the RSs, an indication of a timing configuration for receiving the RSs. Additionally, or alternatively, the communication manager 140 may perform one or more other operations described herein.

In some aspects, the network node 110 may include a communication manager 150. As described in more detail elsewhere herein, the communication manager 150 may receive, from a UE, an indication of information associated with a periodicity of RSs; and transmit, based at least in part on the indication of information associated with the periodicity of the RSs, an indication of a timing configuration for transmitting the RSs. Additionally, or alternatively, the communication manager 150 may perform one or more other operations described herein.

As indicated above, FIG. 1 is provided as an example. Other examples may differ from what is described with regard to FIG. 1.

Figure 2:
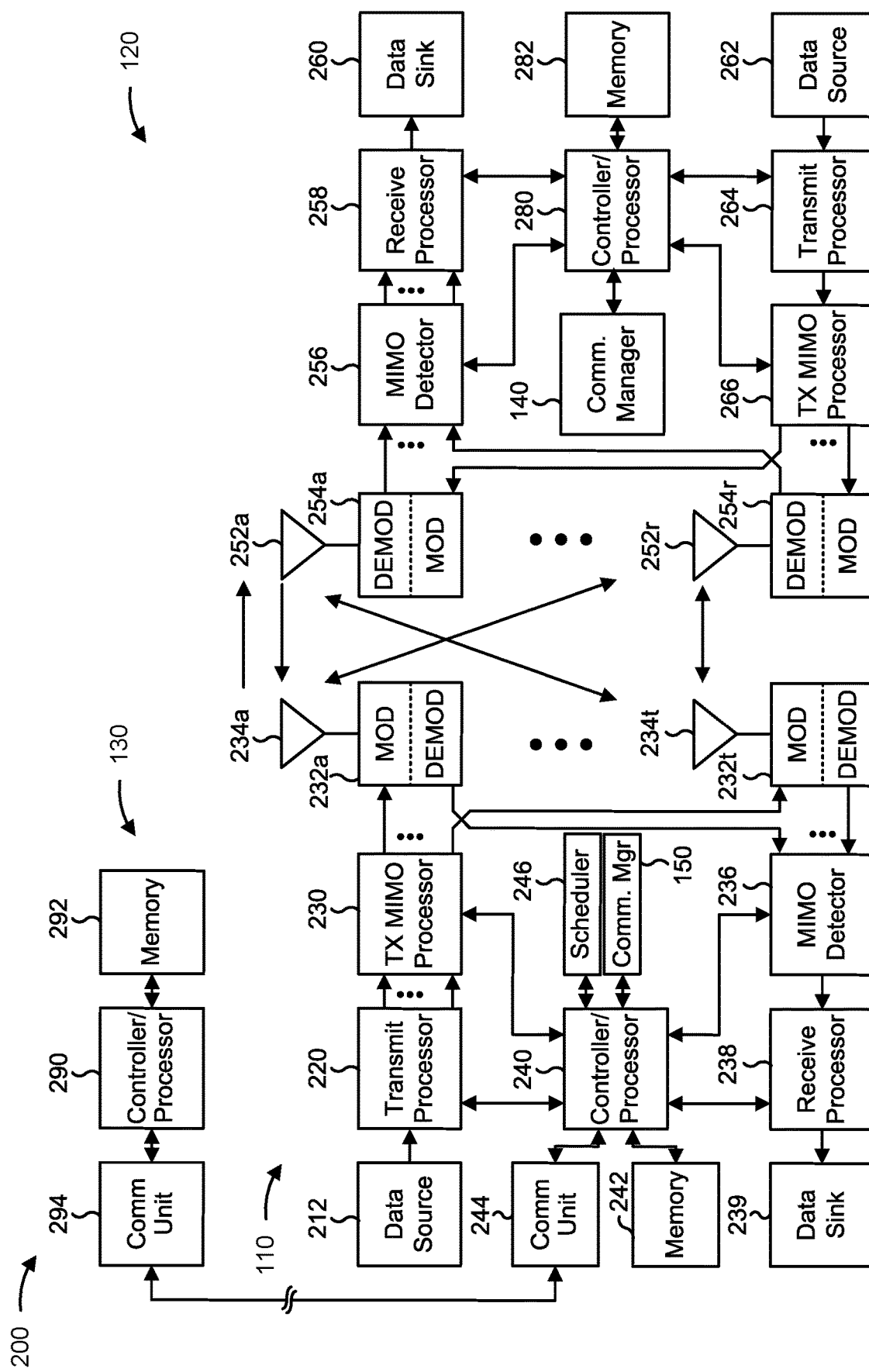
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the network node 110, the controller/processor 280 of the UE 120, and/or any other component(s) of FIG. 2 may perform one or more techniques associated with reference signal periodicity based at least in part on user equipment information, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE includes means for transmitting an indication of information associated with a periodicity of RSs; and/or means for receiving, based at least in part on the indication of information associated with the periodicity of the RSs, an indication of a timing configuration for receiving the RSs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving, from a UE, an indication of information associated with a periodicity of RSs; and/or means for transmitting, based at least in part on the indication of information associated with the periodicity of the RSs, an indication of a timing configuration for transmitting the RSs. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
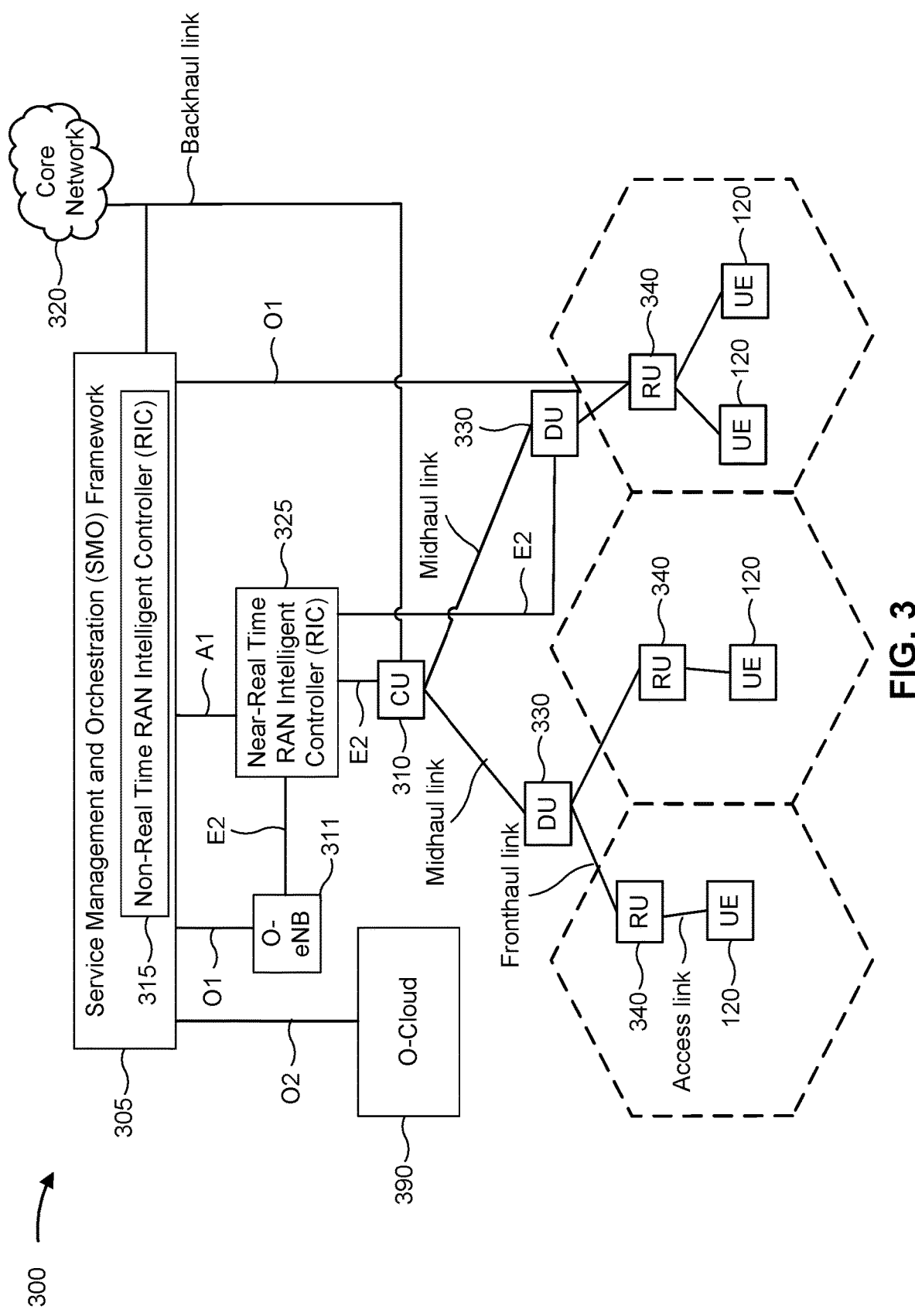
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
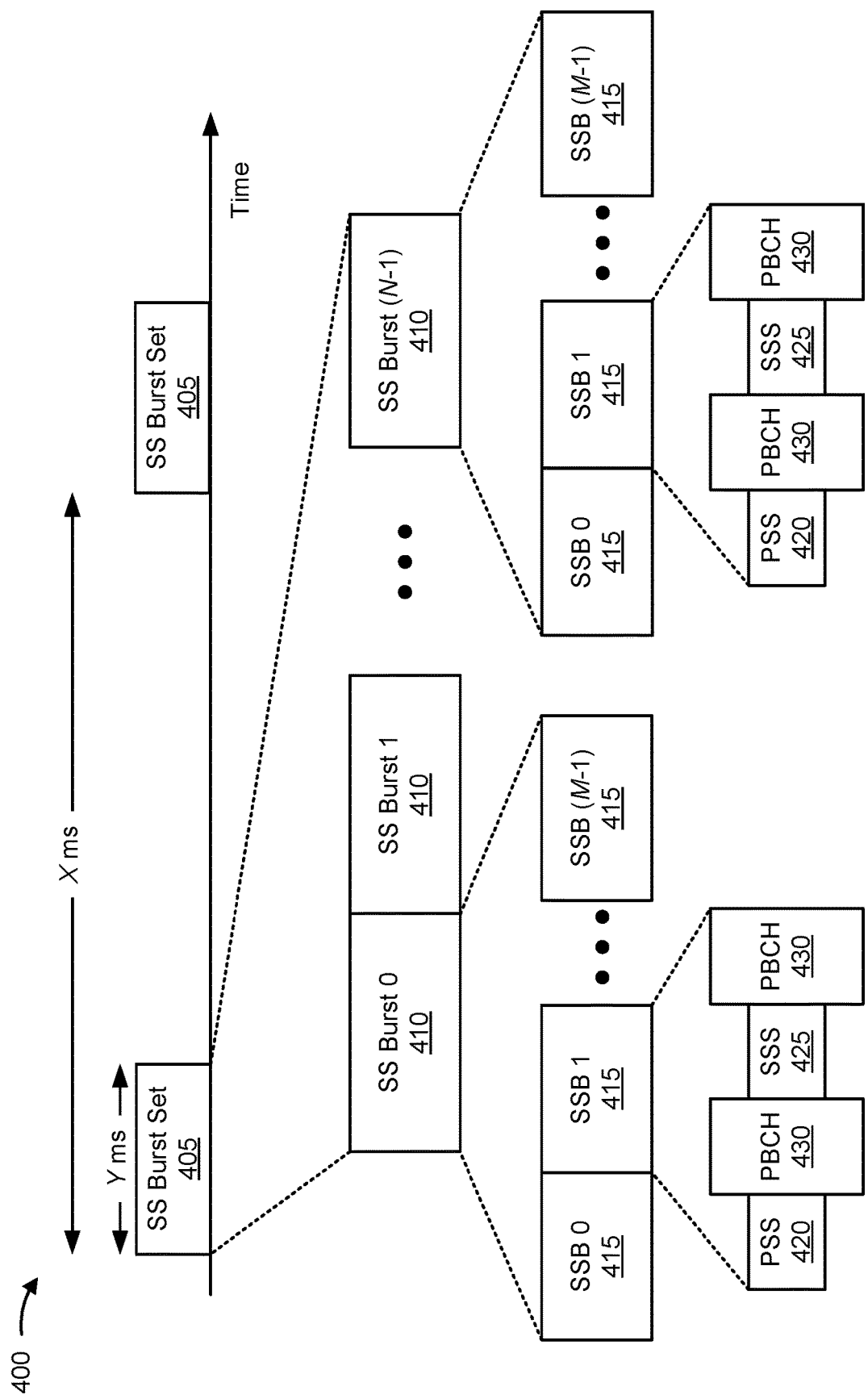
FIG. 4 is a diagram illustrating an example of a synchronization signal (SS) hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by one or more network nodes. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., a network node 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., a network node 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a network node 110 (e.g., directly or via one or more other network nodes). The network node 110 and the UE 120 may use the one or more indicated SSBs 415 to select one or more beams to be used for communication between the network node 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As described herein, a UE may use a reference signal (RS) such as an SSB, tracking reference signal (TRS), or DMRS to obtain information associated with a wireless network and/or to improve communications within the wireless network. For example, a UE may use the RS to discover a cell of the wireless network, connect to the wireless network, and/or camp on the wireless network. This process may be performed once or it may be performed a-periodically (e.g., after losing a connection and/or a radio link failure, among other examples). A UE may use the RS to maintain serving cell and/pr neighbor cell measurements to support mobility and/or a handover procedure between cells. This process may be performed periodically or a-periodically with a generally regular occurrence. A UE may use the RS to maintain a continuous time and frequency synchronization with the wireless network, to maintain a serving beam, and/or to for automatic gain control (AGC) tracking (e.g., in a connected mode), among other examples. This process may be performed periodically and/or with small intervals between RS measurement occasions. Some UEs may use SSBs or TRSs (e.g., a TRS channel) to synchronize with the wireless network.

As indicated above, FIG. 4 is provided as an example. Other examples may differ from what is described with regard to FIG. 4.

In some networks, UEs that are allocated communication resources in slots that are far (e.g., in time and/or slot index) from the RS may experience an increase in errors associated with a carrier frequency offset (CFO), symbol time offset (STO), and/or sampling rate based at least in part on a decreased accuracy of synchronization between a UE clock and a network node clock. The decreased accuracy may limit cell coverage as UEs with large parts-per-million (ppm) clock error and/or high path loss may not be able to decode control channel communications (e.g., via a physical downlink control channel (PDCCH)).

Figure 5:
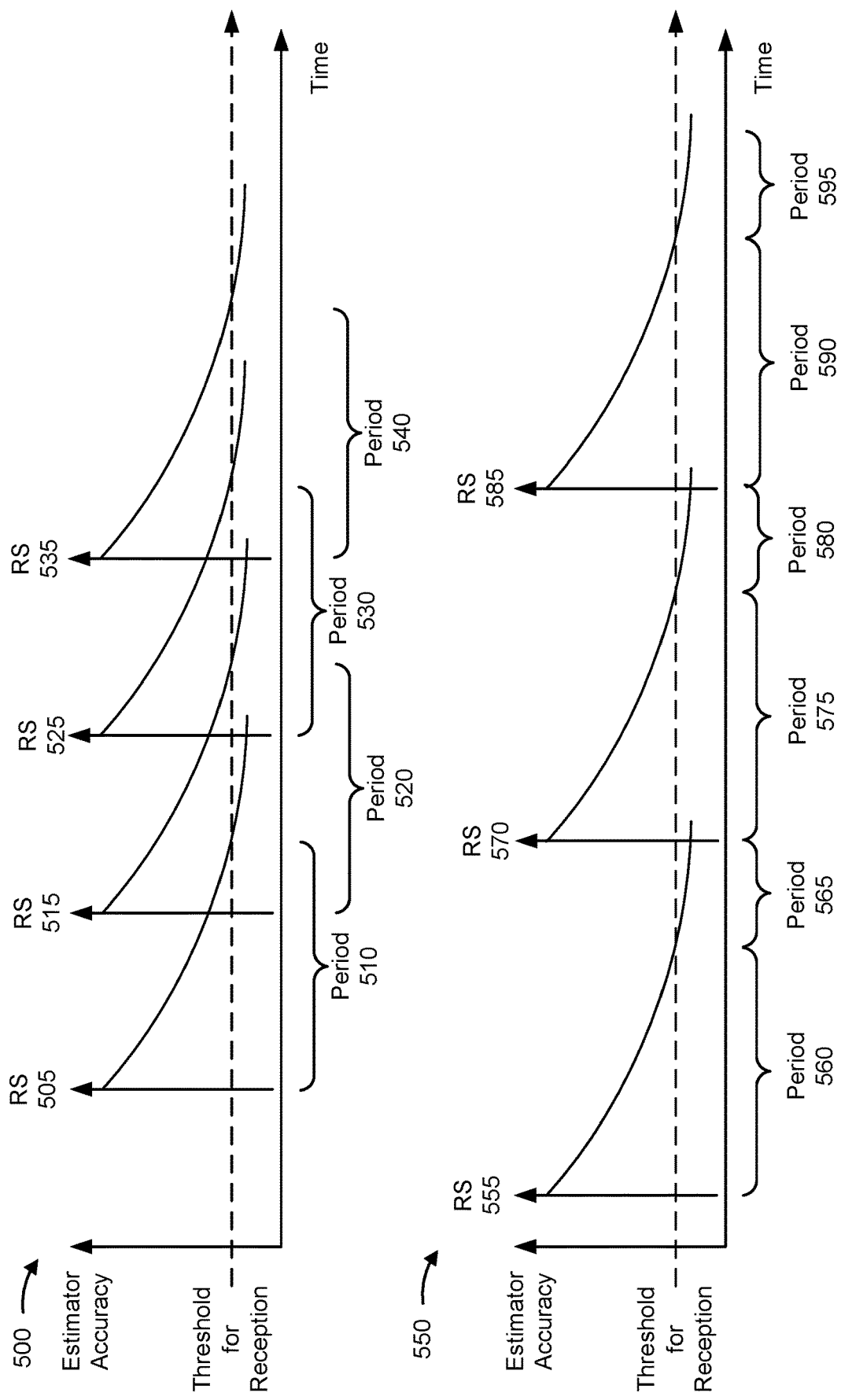
FIG. 5 is a diagram illustrating examples of estimator accuracies over time based at least in part on RS periodicities, in accordance with the present disclosure.

FIG. 5 is a diagram illustrating examples 500 and 550 of estimator accuracies over time based at least in part on RS periodicities, in accordance with the present disclosure.

As shown in example 500, a UE may receive an RS 505. Based at least in part on receiving the RS 505, the UE may have a relatively high estimator accuracy after receiving the RS 505. However the estimator accuracy may decrease as symbols and/or slots are further and further in time from the RS 505. As shown by period 510, the UE may maintain an estimator accuracy (e.g., for synchronization in time and/or frequency) that satisfies a threshold for reception for an amount of time after receiving the RS 505. The threshold for reception may be associated with a threshold estimator accuracy and/or synchronization that is needed to receive control signaling (e.g., a scheduling downlink control information (DCI)) associated with subsequent communications.

Before expiration of the period 510, the UE may receive an RS 515, which the UE may use to increase the estimator accuracy. Again, the estimator accuracy may decrease as symbols and/or slots are further and further in time from the RS 515. As shown by period 520, the UE may maintain an estimator accuracy (e.g., for synchronization in time and/or frequency) that satisfies the threshold for reception for an amount of time after receiving the RS 515. Similarly, the UE may receive an RS 525 to increase the estimator accuracy such that during the period 530 that follows reception of the RS 525, the UE satisfies the threshold for reception. As also shown in example 500, the UE may receive an RS 535 to increase the estimator accuracy such that during the period 540 that follows reception of the RS 535, the UE satisfies the threshold for reception.

As shown in example 500, the UE receives the RSs with a periodicity that is unnecessarily short (e.g., with a density in time that is higher than necessary to maintain estimator accuracy that satisfies the threshold for reception). The RSs create overhead and consume power, computing, communication, and/or network resources that may otherwise have been used to increase throughput of the wireless network.

As shown in example 550, a UE may receive an RS 555. Based at least in part on receiving the RS 555, the UE may have a relatively high estimator accuracy after receiving the RS 555. Similar to example 500, the estimator accuracy may decrease as symbols and/or slots are further and further in time from the RS 555. As shown by period 560, the UE may maintain an estimator accuracy (e.g., for synchronization in time and/or frequency) that satisfies a threshold for reception for an amount of time after receiving the RS 555. However, during a period 565, the estimator accuracy fails to satisfy the threshold for reception until the UE receives an RS 570. During the period 565, the UE may fail to receive communications, such as DCI that schedules subsequent communications. Based at least in part on failing to receive the communications during the period 565, the UE and a network node may consume power, computing, communication, and/or network resources to detect and correct errors associated with the failure.

After receiving the RS 570, the estimator accuracy increases, and the UE may maintain an estimator accuracy that satisfies the threshold for reception during a period 575. After the period 575, the estimator accuracy may not satisfy the threshold for reception during a period 580. Similarly, the UE may receive an RS 585 to increase the estimator accuracy such that during a period 590 that follows reception of the RS 585, the UE (e.g., the estimator accuracy) again satisfies the threshold for reception. However, after the period 590, the estimator accuracy may not satisfy the threshold for reception during a period 595.

As shown in example 550, the UE receives the RSs with a periodicity that is longer than required by the UE for the estimator accuracy to satisfy the threshold for reception (e.g., with a density in time that is less than necessary to maintain estimator accuracy that satisfies the threshold for reception). For example, the periods 565, 580, and 595 may be too far, in a time domain, from a most recent RS to maintain a sufficiently high estimator accuracy. Although increasing a periodicity of the RSs relative to the example 500 may reduce overhead and conserve power, computing, communication, and/or network resources that may otherwise have been used to increase throughput of the wireless network, example 550 may result in increased communication errors that may consume power, computing, communication, and/or network resources to detect and correct the communication errors.

In some networks, and for some UEs, the threshold for reception and/or lengths of the periods 510, 520, 530, 540, 560, 575, and/or 590 may be different based at least in part on network conditions and/or a configuration for communication. For example, the threshold for reception and the periods during which an estimator accuracy satisfies the threshold for reception may be based at least in part on signal-to-noise ratio (SNR), and/or signal-to-interference-plus-noise ratio (SINR), among other examples. In some networks, different beams and/or different UEs connected to the wireless network may have different values for the threshold for reception and for a length of the periods during which an estimator accuracy satisfies the threshold for reception.

As indicated above, FIG. 5 is provided as an example. Other examples may differ from what is described with regard to FIG. 5.

In some aspects described herein, an RS periodicity may be configured based at least in part on information from a UE. In some aspects, a network node may configure a per-UE RS periodicity or a per-beam RS periodicity based at least in part on information provided by one or more UEs in a cell associated with the network node.

If the RS (e.g., SSB, TRS, or DMRS, among other examples) is used by the UE to estimate synchronization loops, the network node may update a periodicity of only a serving SSB beam (e.g., using a field of a system information block (SIB), such as SIB1). Alternatively, the network node may update a periodicity of all or a set of SSB beams according to a majority of connecting and/or reporting UEs or cell edge UEs. In this way, the network node may increase a periodicity (e.g., with a reduced RS density in a time domain) to conserve overhead associated with the RSs and to increase throughput without increasing communication errors. Additionally, or alternatively, the network node may balance overhead of the RSs with a rate of communication errors to optimize a throughput of the wireless network.

In some examples, a UE may report synchronization loops parameters, such as expected clock error (e.g., in ppm), support for SSB or TRS based estimation and/or synchronization, SSB algorithm limitation and/or PDCCH algorithm limitations (e.g., maximum CFO and/or STO to detect and correct), among other examples. The network node may use the report to determine a required or requested RS periodicity. In some aspects, the report may indicate multiple periodicities that are respectively associated with different communication modes. For example, the communication modes may include a sleep mode, an awake mode, a power saving mode, and/or modes associated with different signal strength states (e.g., ranges of SINRs or SNRs, among other examples).

Based at least in part on using the UE report, the wireless network may improve cell edge coverage based at least in part on adapting an RS periodicity that will limit an accumulated CFO and/or STO between two consecutive RSs, which may improve PDCCH decoding probability of UEs on the cell edge. Once the PDCCH is decoded, the UE may update estimators according to DMRSs (e.g., PDCCH DMRSs) for a PDSCH part of a communication to improve decoding of data.

Additionally, or alternatively, the network node may reduce RSs that cause unnecessary overhead. For example, the network node may adapt the RS periodicities according to one or more reports from one or more connected UEs (e.g., using in-band reporting or out-of-band reporting for UEs in a Non Stand Alone mode).

In some aspects, a communication protocol may define a UE-based report of synchronization loops parameters. The report may include an expected clock error (e.g., in PPM), an indication of whether a UE estimator is based at least in part on SSBs and/or TRSs, a PDSCH estimator refresh capability, SSB or PDCCH algorithm limitations (e.g., maximum CFO and/or maximum STO to detect), a desired periodicity for the RSs, and/or indications of different RS periodicities associated with different states of the UE.

In example aspects, after connecting to a cell, a UE may update frequency and/or time tracking loops based at least in part on SSB signals. Updating the frequency and/or time tracking loops may maintain UE alignment with the network. Loop updates may be completely based on the SSB or may be based at least in part on additional RSs, such as UE-specific and/or cell-specific TRSs.

The UE may receive an indication of a configuration for transmitting an indication of information associated with a periodicity of RSs (e.g., associated with maintaining synchronization and/or estimator accuracy). Based at least in part on the configuration, the UE may report an expected clock error (e.g., in PPM and/or in a frequency domain). The expected clock error may be measured after manufacture of the UE and may be transmitted via RRC messages. Additionally, or alternatively, the UE may transmit an indication of what channels the UE uses to estimate synchronization loops (e.g., based at least in part on SSB, TRS, channel state information reference signals (CSI-RSs), DMRS, and/or other examples), a PDSCH estimator refreshment capability (e.g., whether the UE supports updating a UE estimator if a PDSCH allocation exist), and/or a PDCCH algorithm (e.g., to estimate and/or correct errors in synchronization) limitations (e.g., a maximum supported CFO and/or STO).

In some aspects, the UE may transmit an indication of a required number of RSs for closed loops to lock and achieve a minimal residual estimation error. In some aspects, the UE may transmit an indication of a required number of RSs for beam management and/or for a power saving state of the UE. In some aspects, the UE may transmit an indication of an expected residual CFO per received RS. In some aspects, the report may indicate a desired RS periodicity.

In some aspects, the information may be dependent on SNR, SINR, channel conditions, UE complexity, among other examples. In some aspects, the UE may transmit the information via a MAC control element (CE), a channel state feedback report, and/or an RRC message.

Once the network obtains the indoor associated with the periodicity of RSs, the network node may determine an RS periodicity. For example, the network node may update and/or optimize the RS periodicity. In some aspects, the update to the RS periodicity may include different updates per RS beam (e.g., by replacing an indication of the RS periodicity in a SIB to be in a size of a vector per SSB index). In some aspects, the update to the RS periodicity may be common for all SSBs. The network node may base the RS periodicity decision based at least in part on a majority vote of connected UEs or according to cell edge UEs, among other examples. In the majority vote case, there may be bursts of low RS periodicity to support connections for cell edge UEs.

In some aspects, the network node may allocate to the UE slots that are in boundaries of high PDCCH detection probability. For example, the network node may indicate to the UE that the UE is not to receive an allocation during some time periods (e.g., time periods with high likelihoods of errors, such as periods 565, 575, and 590 of FIG. 5). In some aspects, the UE may conserve power during the time periods by, for example, shutting down an RF chain and/or modem based at least in part on expecting not to receive the allocation during the time periods.

In some aspects where non-standalone (NSA) is supported, the network node may configure the UE to use different and/or non-connected bands. For example, the UE may add an indication of SSB algorithm limitations for multiple SINR ranges (e.g., similar to PDCCH limitations but for a connection establishment procedure).

Based at least in part on the UE transmitting the indication of information associated with the periodicities of the RSs, the network node may configure a periodicity of the RSs that conserves power, computing, communication, and/or network resources that may have otherwise been used to transmit unnecessary RSs. Additionally, or alternatively, the network node may configure the periodicity to reduce communication errors that may have otherwise been caused by blindly increasing a periodicity of the RSs (e.g., with reduced density in a time domain), which may conserve power, computing, communication, and/or network resources that may have otherwise been used to detect and correct the communication errors.

Figure 6:
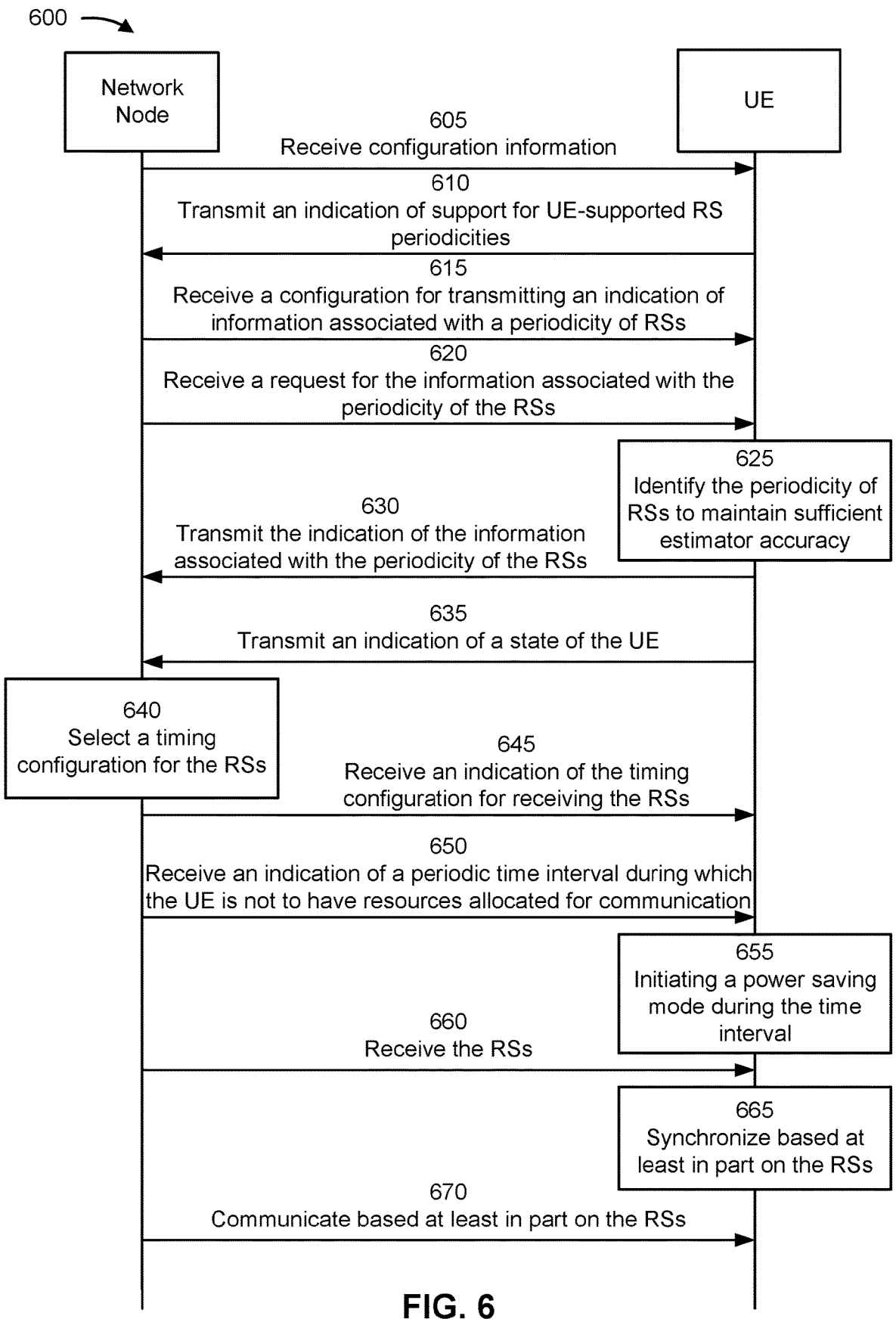
FIG. 6 is a diagram of an example associated with RS periodicity based at least in part on UE information, in accordance with the present disclosure.

FIG. 6 is a diagram of an example 600 associated with RS periodicity based at least in part on UE information, in accordance with the present disclosure. As shown in FIG. 6, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 6.

As shown by reference number 605, the network node may transmit, and the UE may receive, configuration information. In some aspects, the UE may receive the configuration information via one or more of RRC signaling, one or more MAC CEs, and/or DCI, among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit an indication of support for UE-supported RS periodicities. In some aspects, the configuration information may indicate one or more requirements for the UE to support the UE-supported RS periodicities, such as satisfaction of a sensitivity test for detecting clock errors.

The UE may configure itself based at least in part on the configuration information. In some aspects, the UE may be configured to perform one or more operations described herein based at least in part on the configuration information.

As shown by reference number 610, the UE may transmit, and the network node may receive, an indication of support for UE-supported RS periodicities. For example, the UE may transmit an indication that the UE supports transmission of information associated with a network node determination of the periodicity of RSs. In some aspects, the indication of support may indicate a type of information that the UE supports for providing to the network node. For example, the UE may support providing the network node with a set of information that is limited based at least in part on a security restriction of the UE (e.g., to prevent unnecessary dissemination of personal information).

In some aspects, the RSs may be one or more types of RSs that are associated with maintenance of tracking loops for communication with the network node. For example, the RSs may include SSBs, TRSs, CSI-RSs, and/or DMRSs, among other examples.

As shown by reference number 615, the UE may receive, and the network node may transmit, a configuration for transmitting an indication of information associated with the periodicity of the RSs. In some aspects, the configuration may be associated with a format for indicating the information, an amount of information to include, information elements to include, and/or a message type to use to transmit the information (e.g., RRC, MAC CE, and/or DCI).

As shown by reference number 620, the UE may receive, and the network node may transmit, a request for the information associated with the periodicity of the RSs. In some aspects, the network node may transmit the request based at least in part on a triggering event, such as an initial connection with the UE, a beam switch, and/or a handover, among other examples. In some aspects, the network node may transmit the request based at least in part on expiration of a validity window of a previous transmission of information associated with the periodicity of the RSs.

As shown by reference number 625, the UE may identify the periodicity of the RSs to maintain sufficient estimator accuracy. For example, the UE may determine an amount of time for which the UE can use an RS to maintain an estimator accuracy that satisfies a threshold for reception. In some aspects, the periodicity may be based at least in part on channel conditions (e.g., signal strength, such as SNR or SINR, among other examples), a state of the UE (e.g., a power-saving mode, an amount of available resources for an estimator), a configuration of the UE (e.g., a number of antenna groups available, an antenna group used by the UE for communication with the network node, among other examples), and/or a location of the UE relative to the network node, among other examples.

As shown by reference number 630, the UE may transmit, and the network node may receive, the indication of the information associated with the periodicity of the RSs. In some aspects, the indication of the information may be included in RRC signaling, a MAC CE, and/or uplink control information (UCI) (e.g., based at least in part on support for different message types in the indication of support for UE-supported RS periodicities described in connection with reference number 610, and/or based at least in part on the configuration for transmitting the indication of information as described in connection with reference number 615). In some aspects, the UE may transmit the indication of the information using multiple messages.

In some aspects, the information may be associated with (e.g., may be an explicit indication of, may be an indication that is associated with, and/or is an indication of a configuration that is based at least in part on) one or more parameters of the UE and/or a communication channel. For example, the one or more parameters may include an accumulated clock error of the UE, an expected clock error of the UE, an amount of time after reception of the RSs until a predicted synchronization fails to satisfy a threshold associated with reception of a communication for the UE, and/or a data channel estimator refresh capability of the UE, among other examples. In some aspects, the accumulated clock error or the expected clock error is based at least in part on an error in synchronization, with the synchronization based at least in part on the RSs. In some aspects, the one or more parameters may include RS or control channel algorithm limitations, a requested periodicity of the RSs, or a state of the UE (e.g., as described in connection with reference number 635).

In some aspects, the information indicates one or more channels on which the UE estimates synchronization loops (e.g., SSB, CSI-RS, data, and/or TRS channels, among other examples), a data channel estimator refresh capability, a control channel algorithm limitation, a number of RSs required to achieve a residual estimation error that satisfies a threshold, and/or an expected residual CFO per RS, among other examples. In some aspects, the information explicitly (e.g., via a codepoint and/or with control info) indicates a requested periodicity of the RSs.

In some aspects, the UE may transmit the indication of the information associated with the periodicity of the RSs based at least in part on a capability of the UE and/or or satisfaction of a capability test (e.g., an offline capability test). In some aspects, the UE may transmit the indication of the information associated with the periodicity of the RSs based at least in part on receiving the request for the information as described in connection with reference number 620. In some aspects, the UE may transmit the indication of the information associated with the periodicity of the RSs independently from (e.g., in the absence of) receiving the request for the information as described in connection with reference number 620.

In some aspects, the UE may include information elements within the information based at least in part on the configuration for transmitting the indication, as described in connection with reference number 615, and/or based at least in part on a configuration of the UE. For example, the UE may limit information elements to include in the information based at least in part on a security setting of the UE that restricts transmission of private or secure information.

In some aspects, the UE may transmit the indication of the information associated with the periodicity of the RSs using a different frequency band than a frequency band used to receive the RSs. For example, the UE may receive the RSs (e.g., as described in connection with reference number 660) on a first frequency band and may transmit the indication of information associated with the periodicity of the RSs comprises transmitting the indication via a second frequency band. The second frequency band may not overlap with the first frequency band and/or may not be adjacent to the first frequency band. In some aspects, the information may indicate RS algorithm limitations associated with different signal strengths for communications via the first frequency band. This may be based at least in part on the indication of the information not providing an indication of signal strengths over the first frequency band.

As shown by reference number 635, the UE may transmit, and the network node may receive, an indication of a state of the UE. In some aspects, the UE may transmit an indication that the UE is in a state associated with a power saving mode and/or an amount of resources (e.g., power and/or computing) available for the UE to apply to communications with the network node and/or to apply to maintaining synchronization (e.g., via tracking loops).

As shown by reference number 640, the network node may select a timing configuration for the RSs. In some aspects, the network node may select the timing configuration based at least in part on receiving the indication of the information associated with the periodicity of the RSs, as described in connection with reference number 630. In some aspects, the network node may select the timing configuration based at least in part on the indication of the state of the UE as described in connection with reference number 635, the configuration information described in connection with reference number 605, and/or the configuration for transmitting the indication of information associated with the periodicity of the RSs as described in connection with reference number 615.

In some aspects, the timing configuration is one of a set of candidate timing configurations. In some aspects, the set of candidate timing configurations are associated with different states of the UE, different UE types, and/or different signal strengths (e.g., SINR and/or SNR, among other examples).

In some aspects, the network node may determine the periodicity of the RSs based at least in part on the information (e.g., with the information indicating capabilities of the UE). In some aspects, the network node may use, or base the timing configuration at least in part on, a requested periodicity of the RSs within the information. In some aspects, the network node may determine the RSs based at least in part on indications, from multiple UE, of information associated with the periodicity of the RSs. In some aspects, the network node may average, and/or use a majority vote from, periodicities that are optimize for each of the multiple UEs.

As shown by reference number 645, the UE may receive, and the network node may transmit, an indication of the timing configuration for receiving the RSs. The timing configuration may indicate the periodicity of the RSs. In some aspects, the network node may transmit, and the UE may receive, the indication of the timing configuration based at least in part on the UE transmitting the indication of the information associated with the periodicity of the RSs.

In some aspects, the indication may include a codepoint that maps to a timing configuration of the set of candidate timing configurations as previously configured or otherwise known to the UE (e.g., within a communication standard). In some aspects, the indication may include, or be included within, a SIB, such as a SIB1. In some aspects, the indication may be UE-specific, beam-specific, or cell-specific, among other examples.

As shown by reference number 650, the UE may receive, and the network node may transmit, an indication of a periodic time interval during which the UE is not to have resources allocated for communication. For example, the indication may indicate that the UE is not to receive a control channel communication during the periodic time interval. In some aspects, the periodic time interval may be associated with a period of time during which the network node expects the UE not to satisfy a threshold for reception based at least in part on an estimator accuracy. For example, the periodic time interval may begin at a time that is based at least in part on a distance in time following a most recent RS of the RSs and/or the periodic time interval may end at or around a time of a subsequent RS.

In some aspects, the network node may transmit the indication of the periodic time interval based at least in part on the timing configuration for receiving the RSs setting a periodicity of the RSs that is too large for the UE to maintain synchronization during an entire time between the RSs (e.g., the UE maintains synchronization during only a portion of the time between the RSs).

As shown by reference number 655, the UE may initiate a power saving mode during the time interval (e.g., as described in connection with reference number 650). For example, the UE may shut down an RF chain and/or a modem during the time interval.

As shown by reference number 660, the UE may receive, and the network node may transmit, the RSs. In some aspects, the UE may receive the RSs as SSBs, TRSs, CSI-RSs, and/or DMRSs (e.g., within a data channel).

As shown by reference number 665, the UE may synchronize with the network node based at least in part on the RSs. For example, the UE may use a reception time of the RSs to determine a time clock of the network node and/or to synchronize a time clock to the UE to the time clock of the network node. In some aspects, the UE may use the RSs to determine a timing advance to use in communications with the network node.

As shown by reference number 670, the UE and the network node may communicate based at least in part on the RSs. For example, the network node may transmit a control channel communication (e.g., DCI) to the network node based at least in part on the UE being synchronized with the network node (e.g., by using the RSs). In some aspects, the UE may use the control channel communication (e.g., including any RSs and/or pilots within the control channel communication) to further synchronize with the network node for reception and/or decoding of a data channel communication.

Based at least in part on the UE transmitting the indication of information associated with the periodicities of the RSs, the network node may configure a periodicity of the RSs that conserves power, computing, communication, and/or network resources that may have otherwise been used to transmit unnecessary RSs. Additionally, or alternatively, the network node may configure the periodicity to reduce communication errors that may have otherwise been caused by blindly increasing a periodicity of the RSs (e.g., with reduced density in a time domain), which may conserve power, computing, communication, and/or network resources that may have otherwise been used to detect and correct the communication errors.

As indicated above, FIG. 6 is provided as an example. Other examples may differ from what is described with respect to FIG. 6.

Figure 7:
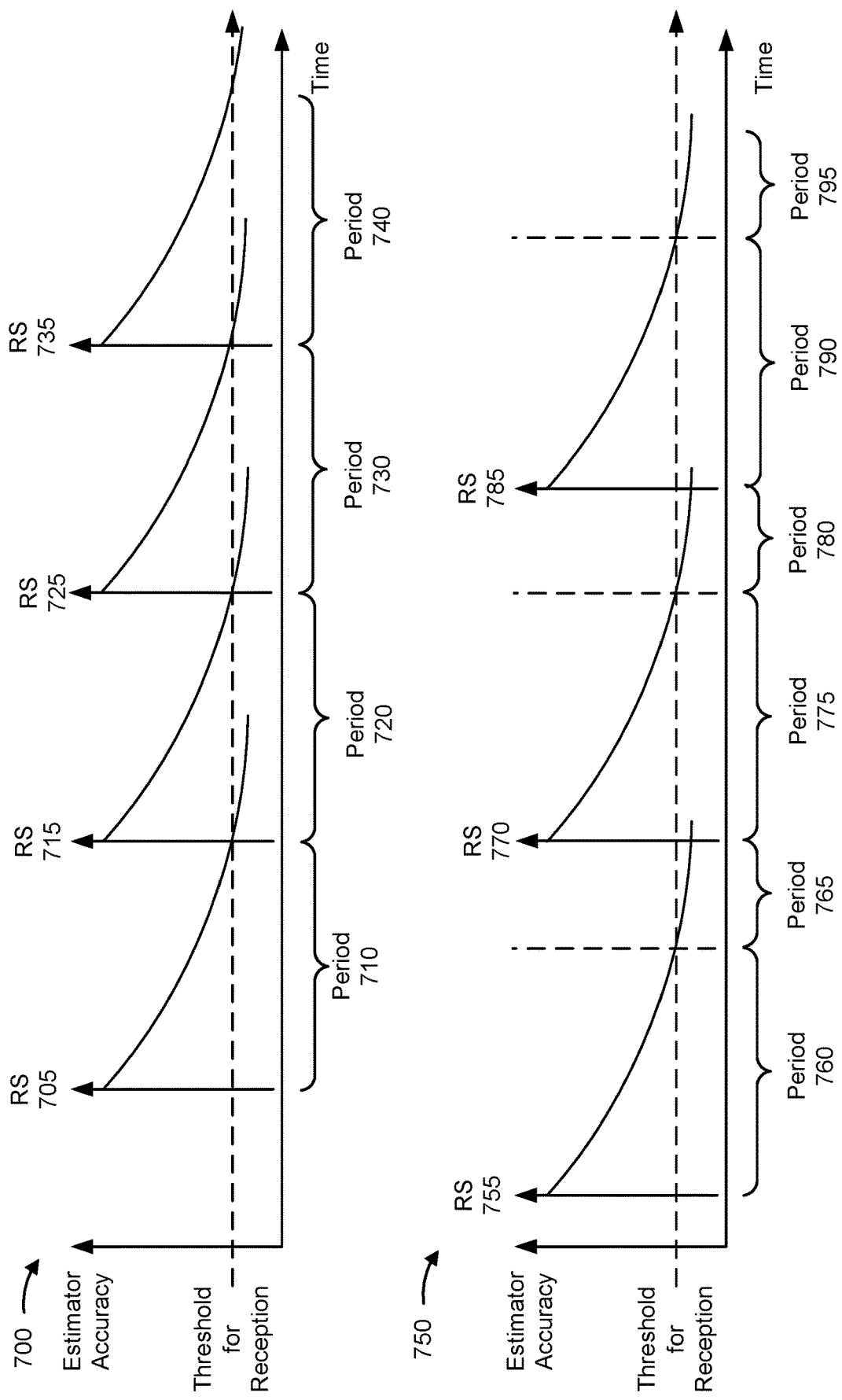
FIG. 7 is a diagram illustrating examples of RS periodicity based at least in part on UE information, in accordance with the present disclosure.

FIG. 7 is a diagram illustrating examples 700 and 750 of RS periodicity based at least in part on UE information, in accordance with the present disclosure.

As shown in example 700, a UE may receive an RS 705. Based at least in part on receiving the RS 705, the UE may have a relatively high estimator accuracy after receiving the RS 705. However the estimator accuracy may decrease as symbols and/or slots are further and further in time from the RS 705. As shown by period 710, the UE may maintain an estimator accuracy (e.g., for synchronization in time and/or frequency) that satisfies a threshold for reception for an amount of time after receiving the RS 705. The threshold for reception may be associated with a threshold estimator accuracy and/or synchronization that is needed to receive control signaling (e.g., a scheduling DCI) associated with subsequent communications.

At or around expiration of the period 710, the UE may receive an RS 715, which the UE may use to increase the estimator accuracy. Again, the estimator accuracy may decrease as symbols and/or slots are further and further in time from the RS 715. As shown by period 720, the UE may maintain an estimator accuracy (e.g., for synchronization in time and/or frequency) that satisfies the threshold for reception for an amount of time after receiving the RS 715. Similarly, the UE may receive an RS 725 to increase the estimator accuracy such that during the period 730 that follows reception of the RS 725, the UE satisfies the threshold for reception. As also shown in example 700, the UE may receive an RS 735 to increase the estimator accuracy such that during the period 740 that follows reception of the RS 735, the UE satisfies the threshold for reception.

As shown in example 700, the UE receives the RSs with a periodicity that maintains an estimator accuracy that satisfies the threshold for reception. In some aspects, the periodicity may be configuration to reduce an amount of overlap between the periods 710, 720, 730, and 740. This may reduce overhead and conserve power, computing, communication, and/or network resources that may otherwise have been used to transmit the RSs with an unnecessarily high density in a time domain.

As shown in example 750, a UE may receive an RS 755. Based at least in part on receiving the RS 755, the UE may have a relatively high estimator accuracy after receiving the RS 755. Similar to example 700, the estimator accuracy may decrease as symbols and/or slots are further and further in time from the RS 755. As shown by period 760, the UE may maintain an estimator accuracy (e.g., for synchronization in time and/or frequency) that satisfies a threshold for reception for an amount of time after receiving the RS 755. However, during a period 765, the estimator accuracy fails to satisfy the threshold for reception until the UE receives an RS 770. The network node may indicate that the UE is not to receive communications during the period 765 and/or that the UE should enter a power saving mode during the period 765.

After receiving the RS 770, the estimator accuracy increases, and the UE may maintain an estimator accuracy that satisfies the threshold for reception during a period 775. After the period 775, the estimator accuracy may not satisfy the threshold for reception during a period 780. Similar to the period 765, the network node may indicate that the UE is not to receive communications during the period 780 and/or that the UE should enter a power saving mode during the period 780. The UE may receive an RS 785 to increase the estimator accuracy such that during a period 790 that follows reception of the RS 785, the UE (e.g., the estimator accuracy) again satisfies the threshold for reception. However, after the period 790, the estimator accuracy may not satisfy the threshold for reception during a period 795. Similar to the period 765, the network node may indicate that the UE is not to receive communications during the period 795 and/or that the UE should enter a power saving mode during the period 795.

As shown in example 750, the UE receives the RSs with a periodicity that is longer than required by the UE for the estimator accuracy to satisfy the threshold for reception (e.g., with a density in time that is less than necessary to maintain estimator accuracy that satisfies the threshold for reception). For example, the periods 765, 780, and 795 may be too far, in a time domain, from a most recent RS to maintain a sufficiently high estimator accuracy. In this way, the network node may reduce overhead and conserve power, computing, communication, and/or network resources that may otherwise have been used to increase throughput of the wireless network, and in example 750, the network node may avoid increased communication errors that may have been caused by attempting to communication during the periods 765, 780, and 795.

As indicated above, FIG. 7 is provided as an example. Other examples may differ from what is described with regard to FIG. 7.

Figure 8:
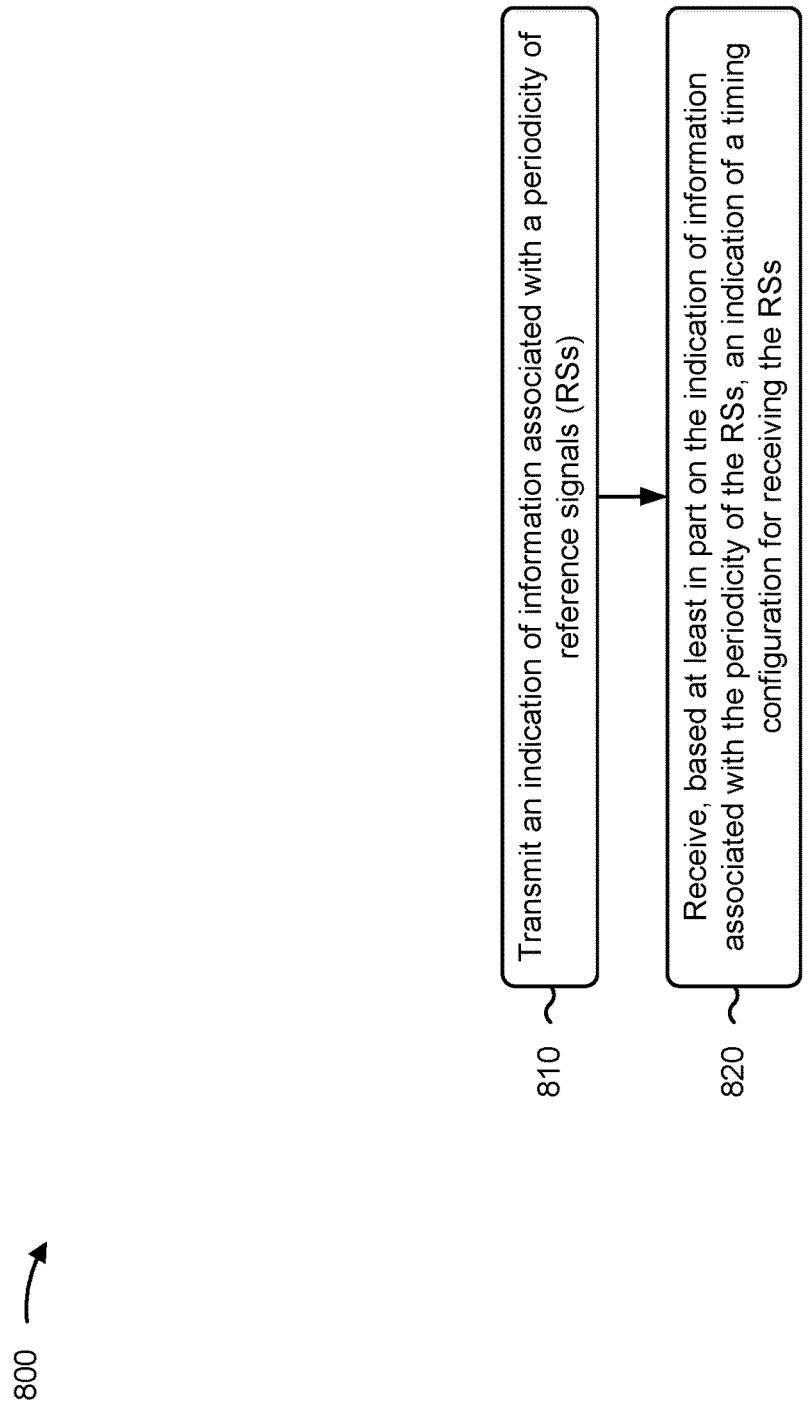
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with RS periodicity based at least in part on UE information.

As shown in FIG. 8, in some aspects, process 800 may include transmitting an indication of information associated with a periodicity of RSs (block 810). For example, the UE (e.g., using communication manager 140 and/or transmission component 1004, depicted in FIG. 10) may transmit an indication of information associated with a periodicity of RSs, as described above.

As further shown in FIG. 8, in some aspects, process 800 may include receiving, based at least in part on the indication of information associated with the periodicity of the RSs, an indication of a timing configuration for receiving the RSs (block 820). For example, the UE (e.g., using communication manager 140 and/or reception component 1002, depicted in FIG. 10) may receive, based at least in part on the indication of information associated with the periodicity of the RSs, an indication of a timing configuration for receiving the RSs, as described above.

Process 800 may include additional aspects, such as any single aspect or any combination of aspects described below and/or in connection with one or more other processes described elsewhere herein.

In a first aspect, the information is associated with one or more of an accumulated clock error, an expected clock error, an amount of time after reception of the RSs until a predicted synchronization fails to satisfy a threshold associated with reception of a communication, a data channel estimator refresh capability, RS or control channel algorithm limitations, a requested periodicity of the RSs, or a state of the UE.

In a second aspect, alone or in combination with the first aspect, the accumulated clock error or the expected clock error is based at least in part on an error in synchronization, with the synchronization based at least in part on the RSs.

In a third aspect, alone or in combination with one or more of the first and second aspects, the information indicates one or more of one or more channels on which the UE estimates synchronization loops, a data channel estimator refresh capability, a control channel algorithm limitation, a number of RSs required to achieve a residual estimation error that satisfies a threshold, or an expected residual CFO per RS.

In a fourth aspect, alone or in combination with one or more of the first through third aspects, the timing configuration is selected from a set of candidate timing configurations, and wherein the timing configuration is selected based at least in part on a state of the UE.

In a fifth aspect, alone or in combination with one or more of the first through fourth aspects, the RSs are associated with maintenance of tracking loops for communication with a network node.

In a sixth aspect, alone or in combination with one or more of the first through fifth aspects, the RSs comprise one or more of signal blocks (SSBs), tracking reference signals (TRSs), channeling state information reference signals (CSI-RSs), or reference signals (DMRSs).

In a seventh aspect, alone or in combination with one or more of the first through sixth aspects, the periodicity of the RSs is beam-specific, or wherein the periodicity of the RSs is cell-specific.

In an eighth aspect, alone or in combination with one or more of the first through seventh aspects, receiving the indication of the timing configuration for receiving the RSs comprises receiving the indication of the timing configuration via a SIB.

In a ninth aspect, alone or in combination with one or more of the first through eighth aspects, transmitting the indication of the information associated with the periodicity of the RSs is based at least in part on one or more of a capability of the UE, or a satisfaction of a capability test.

In a tenth aspect, alone or in combination with one or more of the first through ninth aspects, process 800 includes receiving a request for the information associated with the periodicity of the RSs, wherein transmitting the indication of the information is based at least in part on receiving the request for the information.

In an eleventh aspect, alone or in combination with one or more of the first through tenth aspects, process 800 includes receiving a configuration of information to include in the indication of the information associated with the periodicity of the RSs, wherein transmitting the indication of the information is based at least in part on receiving the configuration.

In a twelfth aspect, alone or in combination with one or more of the first through eleventh aspects, process 800 includes receiving an indication of a periodic time interval during which the UE is not to have resources for communication, wherein the periodic time interval begins at a time that is based at least in part on a distance in time following a most recent RS of the RSs.

In a thirteenth aspect, alone or in combination with one or more of the first through twelfth aspects, process 800 includes initiating a power saving mode during the periodic time interval.

In a fourteenth aspect, alone or in combination with one or more of the first through thirteenth aspects, process 800 includes receiving the RSs on a first frequency band, wherein transmitting the indication of information associated with the periodicity of the RSs comprises transmitting the indication via a second frequency band that does not overlap with the first frequency band.

In a fifteenth aspect, alone or in combination with one or more of the first through fourteenth aspects, the information indicates RS algorithm limitations associated with different signal strengths for communications via the first frequency band.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
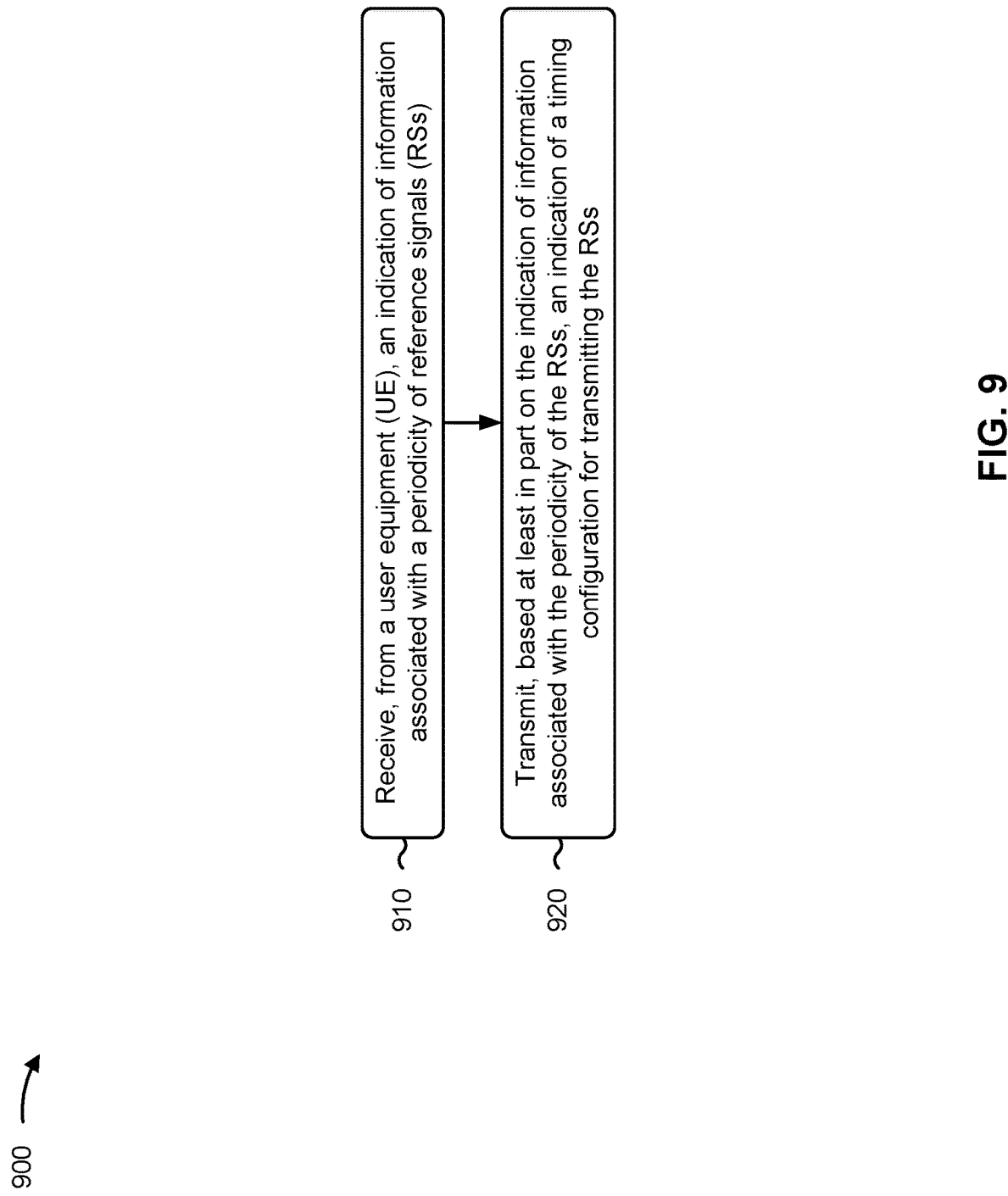
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with reference signal periodicity based at least in part on user equipment information.

As shown in FIG. 9, in some aspects, process 900 may include receiving, from a UE, an indication of information associated with a periodicity of RSs (block 910). For example, the network node (e.g., using communication manager 150 and/or reception component 1102, depicted in FIG. 11) may receive, from a UE, an indication of information associated with a periodicity of RSs, as described above.

As further shown in FIG. 9, in some aspects, process 900 may include transmitting, based at least in part on the indication of information associated with the periodicity of the RSs, an indication of a timing configuration for transmitting the RSs (block 920). For example, the network node (e.g., using communication manager 150 and/or transmission component 1104, depicted in FIG. 11) may transmit, based at least in part on the indication of information associated with the periodicity of the RSs, an indication of a timing configuration for transmitting the RSs, as described above.

Process 900 may include additional aspects, such as any single aspect or any combination of aspects described below and/or in connection with one or more other processes described elsewhere herein.

In a first aspect, the information is associated with one or more of an accumulated clock error of the UE, an expected clock error of the UE, an amount of time after reception of the RSs until a predicted synchronization fails to satisfy a threshold associated with reception of a communication by the UE, a data channel estimator refresh capability of the UE, RS or control channel algorithm limitations of the UE, a requested periodicity of the RSs for the UE, or a state of the UE.

In a second aspect, alone or in combination with the first aspect, the accumulated clock error or the expected clock error is based at least in part on an error in synchronization, with the synchronization based at least in part on the RSs.

In a third aspect, alone or in combination with one or more of the first and second aspects, the information indicates one or more of one or more channels on which the UE estimates synchronization loops, a data channel estimator refresh capability of the UE, a control channel algorithm limitation of the UE, a number of RSs required for the UE to achieve a residual estimation error that satisfies a threshold, or an expected residual CFO per RS for the UE.

In a fourth aspect, alone or in combination with one or more of the first through third aspects, process 900 includes selecting the timing configuration from a set of candidate timing configurations, wherein selection of the timing configuration is based at least in part on a state of the UE.

In a fifth aspect, alone or in combination with one or more of the first through fourth aspects, the RSs are associated with maintenance of tracking loops for communication with a network node.

In a sixth aspect, alone or in combination with one or more of the first through fifth aspects, the RSs comprise one or more of signal blocks (SSBs), TRSs, channeling state information reference signals (CSI-RSs), or reference signals (DMRSs).

In a seventh aspect, alone or in combination with one or more of the first through sixth aspects, the periodicity of the RSs is beam-specific, or wherein the periodicity of the RSs is cell-specific.

In an eighth aspect, alone or in combination with one or more of the first through seventh aspects, transmitting the indication of the timing configuration for receiving the RSs comprises transmitting the indication of the timing configuration via a SIB.

In a ninth aspect, alone or in combination with one or more of the first through eighth aspects, receiving the indication of the information associated with the periodicity of the RSs is based at least in part on one or more of a capability of the UE, or a satisfaction of a capability test.

In a tenth aspect, alone or in combination with one or more of the first through ninth aspects, process 900 includes transmitting a request for the information associated with the periodicity of the RSs, wherein receiving the indication of the information is based at least in part on receiving the request for the information.

In an eleventh aspect, alone or in combination with one or more of the first through tenth aspects, process 900 includes transmitting a configuration of information to include in the indication of the information associated with the periodicity of the RSs, wherein receiving the indication of the information is based at least in part on receiving the configuration.

In a twelfth aspect, alone or in combination with one or more of the first through eleventh aspects, process 900 includes transmitting an indication of a periodic time interval during which the UE is not to have resources for communication, wherein the periodic time interval begins at a time that is based at least in part on a distance in time following a most recent RS of the RSs.

In a thirteenth aspect, alone or in combination with one or more of the first through twelfth aspects, process 900 includes transmitting an indication to initiate a power saving mode during the periodic time interval.

In a fourteenth aspect, alone or in combination with one or more of the first through thirteenth aspects, process 900 includes transmitting the RSs on a first frequency band, wherein receiving the indication of information associated with the periodicity of the RSs comprises receiving the indication via a second frequency band that does not overlap with the first frequency band.

In a fifteenth aspect, alone or in combination with one or more of the first through fourteenth aspects, the information indicates RS algorithm limitations associated with different signal strengths for communications via the first frequency band.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
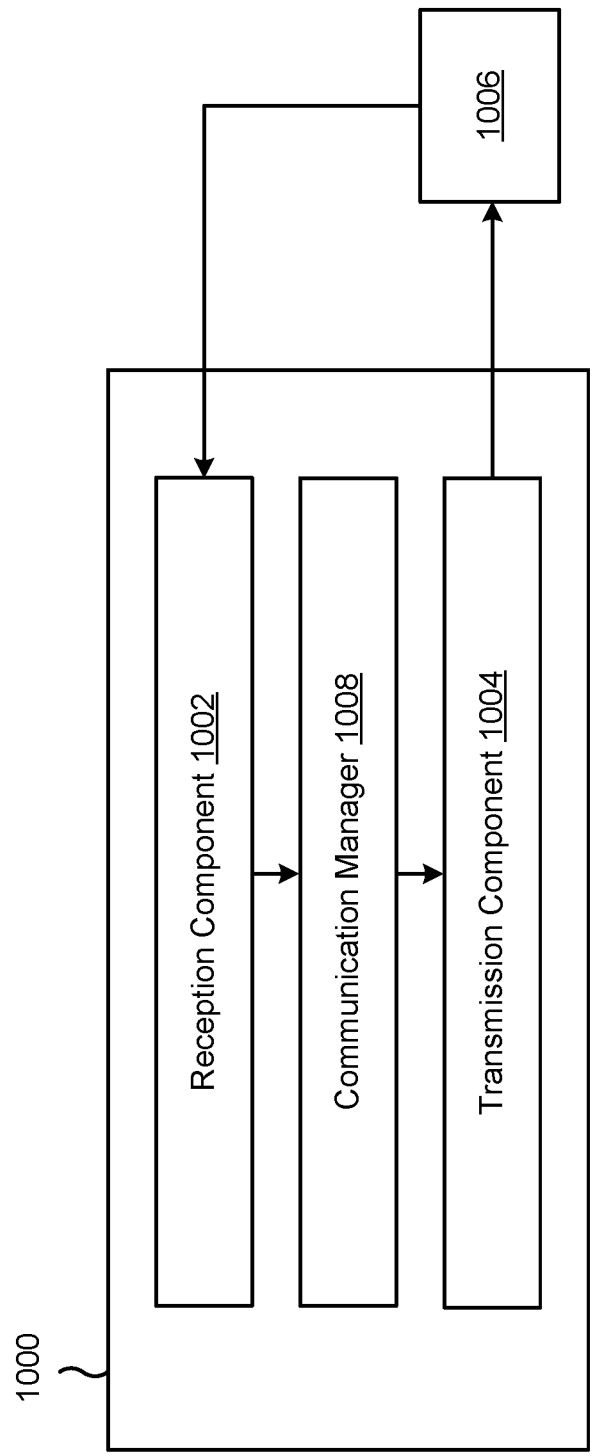
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 140).

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The transmission component 1004 may transmit an indication of information associated with a periodicity of RSs. The reception component 1002 may receive, based at least in part on the indication of information associated with the periodicity of the RSs, an indication of a timing configuration for receiving the RSs.

The reception component 1002 may receive a request for the information associated with the periodicity of the RSs wherein transmitting the indication of the information is based at least in part on receiving the request for the information.

The reception component 1002 may receive a configuration of information to include in the indication of the information associated with the periodicity of the RSs wherein transmitting the indication of the information is based at least in part on receiving the configuration.

The reception component 1002 may receive an indication of a periodic time interval during which the UE is not to have resources for communication wherein the periodic time interval begins at a time that is based at least in part on a distance in time following a most recent RS of the RSs.

The communication manager 1008 may initiate a power saving mode during the periodic time interval.

The reception component 1002 may receive the RSs on a first frequency band wherein transmitting the indication of information associated with the periodicity of the RSs comprises transmitting the indication via a second frequency band that does not overlap with the first frequency band.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
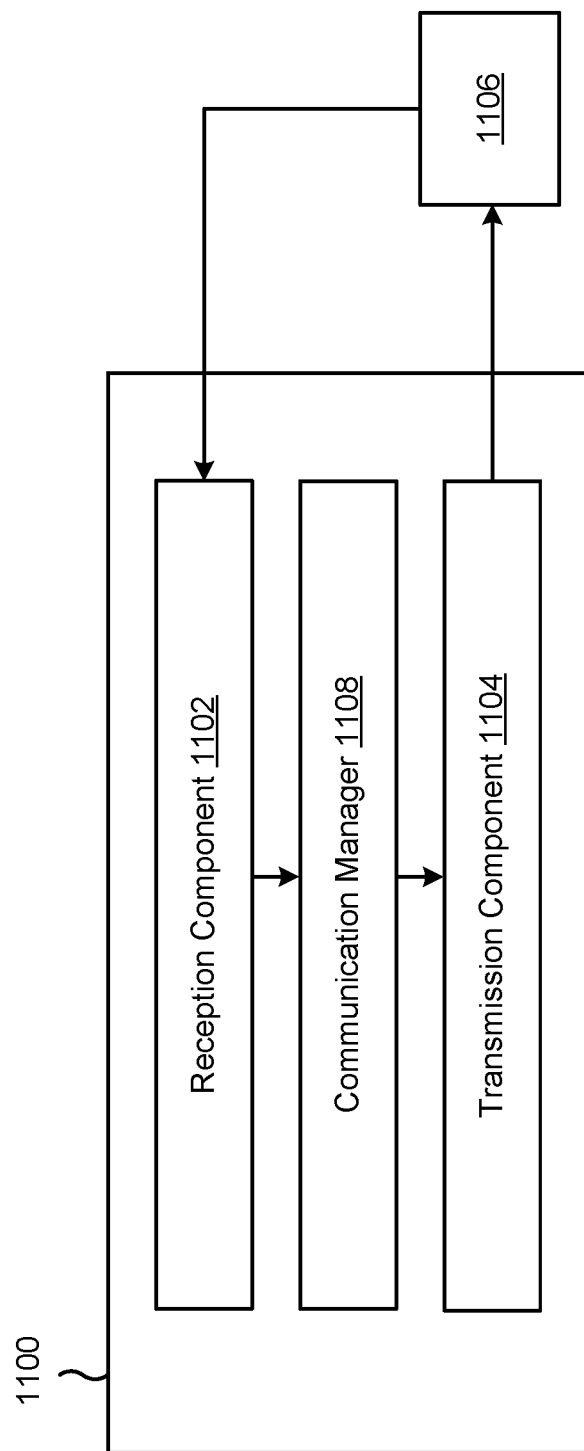
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150).

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The reception component 1102 may receive, from a UE, an indication of information associated with a periodicity of RSs. The transmission component 1104 may transmit, based at least in part on the indication of information associated with the periodicity of the RSs, an indication of a timing configuration for transmitting the RSs.

The communication manager 1108 may select the timing configuration from a set of candidate timing configurations wherein selection of the timing configuration is based at least in part on a state of the UE.

The transmission component 1104 may transmit a request for the information associated with the periodicity of the RSs wherein receiving the indication of the information is based at least in part on receiving the request for the information.

The transmission component 1104 may transmit a configuration of information to include in the indication of the information associated with the periodicity of the RSs wherein receiving the indication of the information is based at least in part on receiving the configuration.

The transmission component 1104 may transmit an indication of a periodic time interval during which the UE is not to have resources for communication wherein the periodic time interval begins at a time that is based at least in part on a distance in time following a most recent RS of the RSs.

The transmission component 1104 may transmit an indication to initiate a power saving mode during the periodic time interval.

The transmission component 1104 may transmit the RSs on a first frequency band wherein receiving the indication of information associated with the periodicity of the RSs comprises receiving the indication via a second frequency band that does not overlap with the first frequency band.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: transmitting an indication of information associated with a periodicity of reference signals (RSs); and receiving, based at least in part on the indication of information associated with the periodicity of the RSs, an indication of a timing configuration for receiving the RSs.

Aspect 2: The method of Aspect 1, wherein the information is associated with one or more of: an accumulated clock error, an expected clock error, an amount of time after reception of the RSs until a predicted synchronization fails to satisfy a threshold associated with reception of a communication, a data channel estimator refresh capability, RS or control channel algorithm limitations, a requested periodicity of the RSs, or a state of the UE.

Aspect 3: The method of Aspect 2, wherein the accumulated clock error or the expected clock error is based at least in part on: an error in synchronization, with the synchronization based at least in part on the RSs.

Aspect 4: The method of any of Aspects 1-3, wherein the information indicates one or more of: one or more channels on which the UE estimates synchronization loops, a data channel estimator refresh capability, a control channel algorithm limitation, a number of RSs required to achieve a residual estimation error that satisfies a threshold, or an expected residual carrier frequency offset (CFO) per RS.

Aspect 5: The method of any of Aspects 1-4, wherein the timing configuration is selected from a set of candidate timing configurations, and wherein the timing configuration is selected based at least in part on a state of the UE.

Aspect 6: The method of any of Aspects 1-5, wherein the RSs are associated with maintenance of tracking loops for communication with a network node.

Aspect 7: The method of any of Aspects 1-6, wherein the RSs comprise one or more of: synchronization signal blocks (SSBs), tracking reference signals (TRSs), channel state information reference signals (CSI-RSs), or demodulation reference signals (DMRSs).

Aspect 8: The method of any of Aspects 1-7, wherein the periodicity of the RSs is beam-specific, or wherein the periodicity of the RSs is cell-specific.

Aspect 9: The method of any of Aspects 1-8, wherein receiving the indication of the timing configuration for receiving the RSs comprises: receiving the indication of the timing configuration via a system information block (SIB).

Aspect 10: The method of any of Aspects 1-9, wherein transmitting the indication of the information associated with the periodicity of the RSs is based at least in part on one or more of: a capability of the UE, or a satisfaction of a capability test.

Aspect 11: The method of any of Aspects 1-10, further comprising receiving a request for the information associated with the periodicity of the RSs, wherein transmitting the indication of the information is based at least in part on receiving the request for the information.

Aspect 12: The method of any of Aspects 1-11, further comprising receiving a configuration of information to include in the indication of the information associated with the periodicity of the RSs, wherein transmitting the indication of the information is based at least in part on receiving the configuration.

Aspect 13: The method of any of Aspects 1-12, further comprising: receiving an indication of a periodic time interval during which the UE is not to have resources for communication, wherein the periodic time interval begins at a time that is based at least in part on a distance in time following a most recent RS of the RSs.

Aspect 14: The method of Aspect 13, further comprising: initiating a power saving mode during the periodic time interval.

Aspect 15: The method of any of Aspects 1-14, further comprising receiving the RSs on a first frequency band, wherein transmitting the indication of information associated with the periodicity of the RSs comprises transmitting the indication via a second frequency band that does not overlap with the first frequency band.

Aspect 16: The method of Aspect 15, wherein the information indicates RS algorithm limitations associated with different signal strengths for communications via the first frequency band.

Aspect 17: A method of wireless communication performed by a network node, comprising: receiving, from a user equipment (UE), an indication of information associated with a periodicity of reference signals (RSs); and transmitting, based at least in part on the indication of information associated with the periodicity of the RSs, an indication of a timing configuration for transmitting the RSs.

Aspect 18: The method of Aspect 17, wherein the information is associated with one or more of: an accumulated clock error of the UE, an expected clock error of the UE, an amount of time after reception of the RSs until a predicted synchronization fails to satisfy a threshold associated with reception of a communication by the UE, a data channel estimator refresh capability of the UE, RS or control channel algorithm limitations of the UE, a requested periodicity of the RSs for the UE, or a state of the UE.

Aspect 19: The method of Aspect 18, wherein the accumulated clock error or the expected clock error is based at least in part on: an error in synchronization, with the synchronization based at least in part on the RSs.

Aspect 20: The method of any of Aspects 17-19, wherein the information indicates one or more of: one or more channels on which the UE estimates synchronization loops, a data channel estimator refresh capability of the UE, a control channel algorithm limitation of the UE, a number of RSs required for the UE to achieve a residual estimation error that satisfies a threshold, or an expected residual carrier frequency offset (CFO) per RS for the UE.

Aspect 21: The method of any of Aspects 17-20, further comprising: selecting the timing configuration from a set of candidate timing configurations, wherein selection of the timing configuration is based at least in part on a state of the UE.

Aspect 22: The method of any of Aspects 17-21, wherein the RSs are associated with maintenance of tracking loops for communication with a network node.

Aspect 23: The method of any of Aspects 17-22, wherein the RSs comprise one or more of: synchronization signal blocks (SSBs), tracking reference signals (TRSs), channel state information reference signals (CSI-RSs), or demodulation reference signals (DMRSs).

Aspect 24: The method of any of Aspects 17-23, wherein the periodicity of the RSs is beam-specific, or wherein the periodicity of the RSs is cell-specific.

Aspect 25: The method of any of Aspects 17-24, wherein transmitting the indication of the timing configuration for receiving the RSs comprises: transmitting the indication of the timing configuration via a system information block (SIB).

Aspect 26: The method of any of Aspects 17-25, wherein receiving the indication of the information associated with the periodicity of the RSs is based at least in part on one or more of: a capability of the UE, or a satisfaction of a capability test.

Aspect 27: The method of any of Aspects 17-26, further comprising transmitting a request for the information associated with the periodicity of the RSs, wherein receiving the indication of the information is based at least in part on receiving the request for the information.

Aspect 28: The method of any of Aspects 17-27, further comprising transmitting a configuration of information to include in the indication of the information associated with the periodicity of the RSs, wherein receiving the indication of the information is based at least in part on receiving the configuration.

Aspect 29: The method of any of Aspects 17-28, further comprising: transmitting an indication of a periodic time interval during which the UE is not to have resources for communication, wherein the periodic time interval begins at a time that is based at least in part on a distance in time following a most recent RS of the RSs.

Aspect 30: The method of Aspect 29, further comprising: transmitting an indication to initiate a power saving mode during the periodic time interval.

Aspect 31: The method of any of Aspects 17-30, further comprising transmitting the RSs on a first frequency band, wherein receiving the indication of information associated with the periodicity of the RSs comprises receiving the indication via a second frequency band that does not overlap with the first frequency band.

Aspect 32: The method of Aspect 31, wherein the information indicates RS algorithm limitations associated with different signal strengths for communications via the first frequency band.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        transmit an indication of information associated with a periodicity of reference signals (RSs), wherein the information is based at least in part on an accumulated clock error or an expected clock error that is based at least in part on an error in synchronization associated with the RSs; and
        receive, based at least in part on the indication of information associated with the periodicity of the RSs, an indication of a timing configuration for receiving the RSs.

2. The UE of claim 1, wherein the information is associated with one or more of:

an amount of time after reception of the RSs until a predicted synchronization fails to satisfy a threshold associated with reception of a communication,
a data channel estimator refresh capability,
RS or control channel algorithm limitations,
a requested periodicity of the RSs, or
a state of the UE.

3. The UE of claim 1, wherein the information indicates one or more of:
one or more channels on which the UE estimates synchronization loops,
a data channel estimator refresh capability,
a control channel algorithm limitation,
a number of RSs required to achieve a residual estimation error that satisfies a threshold, or
an expected residual carrier frequency offset (CFO) per RS.

4. The UE of claim 1, wherein the timing configuration is selected from a set of candidate timing configurations, and
wherein the timing configuration is selected based at least in part on a state of the UE.

5. The UE of claim 1, wherein the RSs are associated with maintenance of tracking loops for communication with a network node.

6. The UE of claim 1, wherein the RSs comprise one or more of:
signal blocks (SSBs),
track reference signals (TRSs),
channel state information reference signals (CSI-RSs), or
reference signals (DMRSs).

7. The UE of claim 1, wherein the periodicity of the RSs is beam-specific, or
wherein the periodicity of the RSs is cell-specific.

8. The UE of claim 1, wherein the one or more processors, to receive the indication of the timing configuration for receiving the RSs, are configured to:
receive the indication of the timing configuration via a system information block (SIB).

9. The UE of claim 1, wherein transmitting the indication of the information associated with the periodicity of the RSs is based at least in part on one or more of:
a capability of the UE, or
a satisfaction of a capability test.

10. The UE of claim 1, wherein the one or more processors are further configured to receive a request for the information associated with the periodicity of the RSs,
wherein transmitting the indication of the information is based at least in part on receiving the request for the information.

11. The UE of claim 1, wherein the one or more processors are further configured to receive a configuration of information to include in the indication of the information associated with the periodicity of the RSs,
wherein transmitting the indication of the information is based at least in part on receiving the configuration.

12. The UE of claim 1, wherein the one or more processors are further configured to:
receive an indication of a periodic time interval during which the UE is not to have resources for communication,
wherein the periodic time interval begins at a time that is based at least in part on a distance in time following a most recent RS of the RSs.

13. The UE of claim 12, wherein the one or more processors are further configured to:
initiate a power saving mode during the periodic time interval.

14. The UE of claim 1, wherein the one or more processors are further configured to receive the RSs on a first frequency band,
wherein the one or more processors, to transmit the indication of information associated with the periodicity of the RSs, are configured to transmit the indication via a second frequency band that does not overlap with the first frequency band.

15. The UE of claim 14, wherein the information indicates RS algorithm limitations associated with different signal strengths for communications via the first frequency band.

16. A network node for wireless communication, comprising:
a memory; and
one or more processors, coupled to the memory, configured to:
receive, from a user equipment (UE), an indication of information associated with a periodicity of reference signals (RSs), wherein the information is based at least in part on an accumulated clock error or an expected clock error of the UE that is based at least in part on an error in synchronization associated with the RSs; and
transmit, based at least in part on the indication of information associated with the periodicity of the RSs, an indication of a timing configuration for transmitting the RSs.

17. The network node of claim 16, wherein the information is associated with one or more of:
an amount of time after reception of the RSs until a predicted synchronization fails to satisfy a threshold associated with reception of a communication by the UE,
a data channel estimator refresh capability of the UE,
RS or control channel algorithm limitations of the UE,
a requested periodicity of the RSs for the UE, or
a state of the UE.

18. The network node of claim 16, wherein the information indicates one or more of:
one or more channels on which the UE estimates synchronization loops,
a data channel estimator refresh capability of the UE,
a control channel algorithm limitation of the UE,
a number of RSs required for the UE to achieve a residual estimation error that satisfies a threshold, or
an expected residual carrier frequency offset (CFO) per RS for the UE.

19. The network node of claim 16, wherein the one or more processors are further configured to:
select the timing configuration from a set of candidate timing configurations,
wherein selection of the timing configuration is based at least in part on a state of the UE.

20. The network node of claim 16, wherein the periodicity of the RSs is beam-specific, or
wherein the periodicity of the RSs is cell-specific.

21. The network node of claim 16, wherein the one or more processors, to transmit the indication of the timing configuration for receiving the RSs, are configured to:
transmit the indication of the timing configuration via a system information block (SIB).

22. The network node of claim 16, wherein receiving the indication of the information associated with the periodicity of the RSs is based at least in part on one or more of:
a capability of the UE, or
a satisfaction of a capability test.

23. The network node of claim 16, wherein the one or more processors are further configured to transmit a request for the information associated with the periodicity of the RSs,
wherein receiving the indication of the information is based at least in part on receiving the request for the information.

24. The network node of claim 16, wherein the one or more processors are further configured to transmit a configuration of information to include in the indication of the information associated with the periodicity of the RSs,
wherein receiving the indication of the information is based at least in part on receiving the configuration.

25. The network node of claim 16, wherein the one or more processors are further configured to:
transmit an indication of a periodic time interval during which the UE is not to have resources for communication,
wherein the periodic time interval begins at a time that is based at least in part on a distance in time following a most recent RS of the RSs.

26. The network node of claim 16, wherein the one or more processors are further configured to transmit the RSs on a first frequency band,
wherein the one or more processors, to receive the indication of information associated with the periodicity of the RSs, are configured to receive the indication via a second frequency band that does not overlap with the first frequency band.

27. A method of wireless communication performed by a user equipment (UE), comprising:
transmitting an indication of information associated with a periodicity of reference signals (RSs), wherein the information is based at least in part on an accumulated clock error or an expected clock error that is based at least in part on an error in synchronization associated with the RSs; and
receiving, based at least in part on the indication of information associated with the periodicity of the RSs, an indication of a timing configuration for receiving the RSs.

28. The method of claim 27, wherein the information is associated with one or more of:
an amount of time after reception of the RSs until a predicted synchronization fails to satisfy a threshold associated with reception of a communication,
a data channel estimator refresh capability,
RS or control channel algorithm limitations,
a requested periodicity of the RSs, or
a state of the UE.

29. The method of claim 27, wherein the information indicates one or more of:
one or more channels on which the UE estimates synchronization loops,
a data channel estimator refresh capability,
a control channel algorithm limitation,
a number of RSs required to achieve a residual estimation error that satisfies a threshold, or
an expected residual carrier frequency offset (CFO) per RS.

30. A method of wireless communication performed by a network node, comprising:
receiving, from a user equipment (UE), an indication of information associated with a periodicity of reference signals (RSs), wherein the information is based at least in part on an accumulated clock error or an expected clock error that is based at least in part on an error in synchronization associated with the RSs; and
transmitting, based at least in part on the indication of information associated with the periodicity of the RSs, an indication of a timing configuration for transmitting the RSs.

* * * * *